US012651963B2

(12) United States Patent (10) Patent No.: US 12,651,963 B2
Huang et al. (45) Date of Patent: Jun. 9, 2026

(54) DIGITAL ISOLATOR

(71) Applicant: Silergy Semiconductor Technology (Hangzhou) LTD, Hangzhou (CN)

(72) Inventors: Xiaodong Huang, Hangzhou (CN); Yufei Dong, Hangzhou (CN); Chen Zhao, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 673 days.

(21) Appl. No.: 18/110,598

(22) Filed: Feb. 16, 2023

(65) Prior Publication Data

US 2023/0283173 A1 Sep. 7, 2023

(30) Foreign Application Priority Data

Mar. 2, 2022 (CN) .......................... 202210204294.4

(51) Int. Cl.
*H02M 1/42* (2007.01)
*H02M 3/335* (2006.01)

(52) U.S. Cl.
CPC ..... *H02M 1/4258* (2013.01); *H02M 3/33515* (2013.01); *H02M 3/33523* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; H02M 1/4258; Y02B 70/1491
See application file for complete search history.

(56) References Cited

U.S. PATENT DOCUMENTS

| | | | |
|---|---|---|---|
| 8,847,503 B2 | 9/2014 | Chang et al. | |
| 9,673,721 B2 | 6/2017 | Trescases et al. | |
| 9,973,220 B2 | 5/2018 | Kramer et al. | |
| 10,038,403 B2 | 7/2018 | Kamath et al. | |
| 10,957,655 B2 * | 3/2021 | Nasum | H01L 21/705 |
| 11,671,138 B2 * | 6/2023 | Manikandan | H04B 1/44 |
| | | | 375/296 |
| 11,809,206 B2 * | 11/2023 | Datta | H04B 1/16 |
| 11,862,377 B2 * | 1/2024 | Tan | H01F 27/2823 |
| 2024/0396439 A1 * | 11/2024 | Gomez-Iglesias | H10D 1/20 |

* cited by examiner

*Primary Examiner* — Jeffrey A Gblende

(57) ABSTRACT

A digital isolator can include: a first die having one of an encoding circuit and a decoding circuit; a second die having one of the encoding circuit and the decoding circuit that is not in the first die, where the first die and the second die are separated from each other; and an isolated transmission structure configured to transmit an encoded signal generated by the encoding circuit to the decoding circuit.

14 Claims, 8 Drawing Sheets

43A

43B

Encoding circuit 41 / Decoding circuit 42

40

71

72

73

74

811
812
81

821
822
82

DIGITAL ISOLATOR

RELATED APPLICATIONS

This application claims the benefit of Chinese Patent Application No. 202210204294.4, filed on Mar. 2, 2022, which is incorporated herein by reference in its entirety.

FIELD OF THE INVENTION

The present invention generally relates to the field of power electronics, and more particularly to digital isolators.

BACKGROUND

In an electronic system, a digital isolator is a device that has a high resistance isolation characteristic when a digital signal and an analog signal are transmitted, in order to realize isolation between an electronic system and the user. Digital isolators typically adopt optical coupling, inductance/magnetic isolation, and capacitance isolation. However, utilization of the substrate of existing digital isolators is not relatively high, and the die area is relatively large, resulting in higher die costs.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
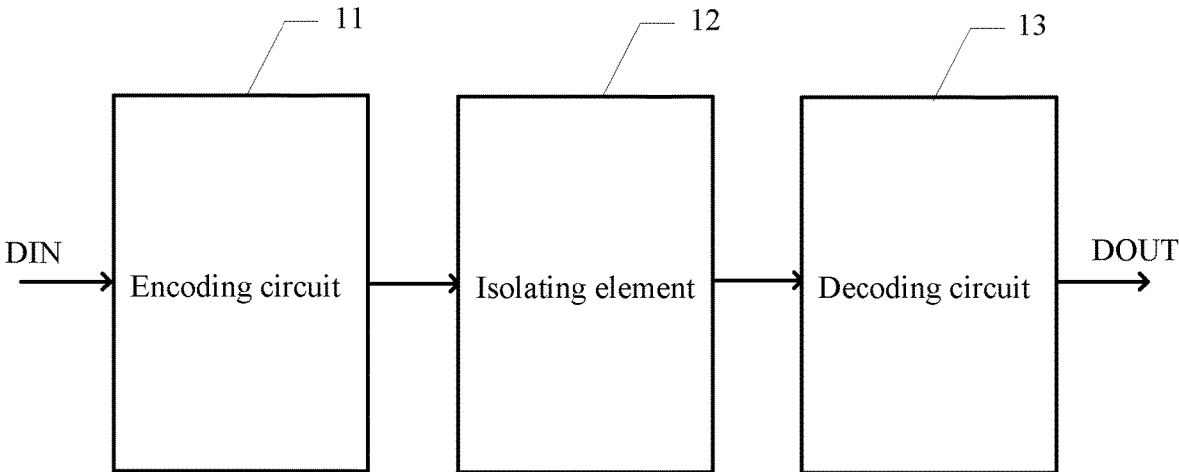
FIG. 1 is a schematic block diagram of a first example digital isolator, in accordance with embodiments of the present invention.

Referring now to FIG. 1, shown is a schematic block diagram of a first example digital isolator, in accordance with embodiments of the present invention. In this particular example, digital isolator 1 can include encoding circuit 11, isolating element 12, and decoding circuit 13. Encoding circuit 11 may receive input digital signal DIN, and convert input digital signal DIN into encoded signals. Isolation element 12 can transmit the encoded signal in an electrical isolation manner. Decoding circuit 13 may convert the encoded signal to output digital signal DOUT that is consistent with input digital signal DIN.

In particular embodiments, after receiving input digital signal DIN, encoding circuit 11 can convert input digital signal DIN into the corresponding encoded signal, and may transmit the encoded signal to decoding circuit 13 through isolation element 12. After receiving the encoded signal, decoding circuit 13 can convert the encoded signal into output digital signal DOUT that is consistent with input digital signal DIN. Electrical isolation transmission of the signal can be realized by the digital isolator element in this example. Optionally, in this example, isolation element 12 can be a transformer, and the transformer can transmit the encoded signal in the form of electromagnetic induction based on the mutually coupled metal windings. In one example, isolation element 12 may also be an isolation capacitor.

Figure 2:
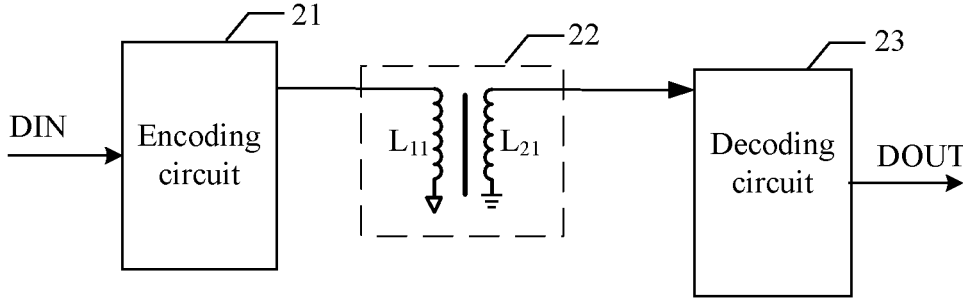
FIG. 2 is a circuit diagram of a second example digital isolator, in accordance with embodiments of the present invention.

Referring now to FIG. 2, shown is a circuit diagram of a second example digital isolator, in accordance with embodiments of the present invention. In this particular example, the digital isolator can include encoding circuit 21, isolation element 22, and decoding circuit 23. Encoding circuit 21 can receive input digital signal DIN and may convert input digital signal DIN into the corresponding encoded signal. The encoded signal can be a pulse signal formed after encoding a rising edge or a falling edge of input digital signal DIN. Isolation element 12 can include primary winding L11, and secondary winding L12 that is coupled with primary winding L11. Primary winding L11 can connect with encoding circuit 21, and secondary winding L12 can connect with decoding circuit 23. When primary winding L11 receives the encoded signal, the encoded signal can be transmitted to decoding circuit 23 through secondary winding L12 in an electromagnetic induction manner. Decoding circuit 23 can convert the received encoded signal into output digital signal DOUT that is consistent with input digital signal DIN. For example, converting the encoded signal into the output digital signal can include decoding the received pulse signal to obtain the output digital signal that is consistent with the input digital signal. It should be understood that isolation element 22 in this example can adjust the number of coupled windings according to particular use requirements.

Figure 3:
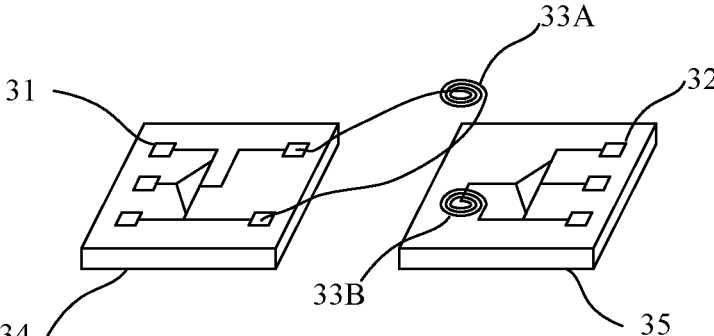
FIG. 3 is a schematic block diagram of a first example digital isolator.

Referring now to FIG. 3, shown is a schematic block diagram of a first example digital isolator. In this particular example, the digital isolator can include encoding circuit 31, decoding circuit 32, and an isolation element. In particular embodiments, encoding circuit 31 can be separately integrated on die 34, decoding circuit 32 and the isolation element can be horizontally integrated one die 35 and arranged side by side on die 35, and die 34 can be electrically isolated from die 35. The isolation element can include windings 33A and 33B. In this example, the digital isolator may occupy a larger die area, resulting in lower utilization of the substrate of the die and higher die costs.

Figure 4:
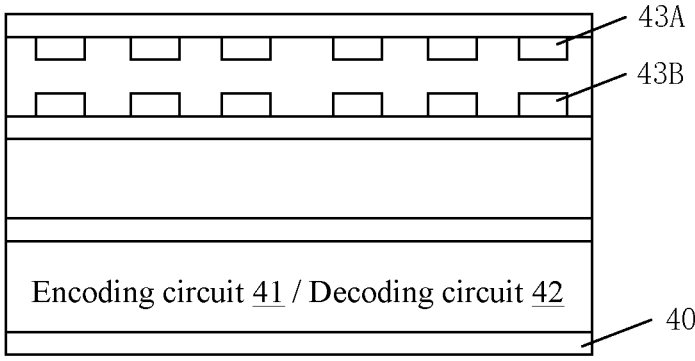
FIG. 4 is a schematic block diagram of a second example digital isolator.

Referring now to FIG. 4, shown is a schematic block diagram of a second example digital isolator. The digital isolator can include encoding circuit 41, decoding circuit 42, and an isolation element. Encoding circuit 41 and decoding circuit 42 can be integrated on substrate 40. The isolation element may be integrated directly above encoding circuit 41 and decoding circuit 42. The isolation element can include windings 43A and 43B. In this example, although the digital isolator reduces the area of the die, encoding circuit 41 and decoding circuit 42 can be integrated on same substrate 40, which increases difficultly in the electrical insulation of the circuit, and affects electrical isolation efficiency of the digital isolator.

Figure 5:
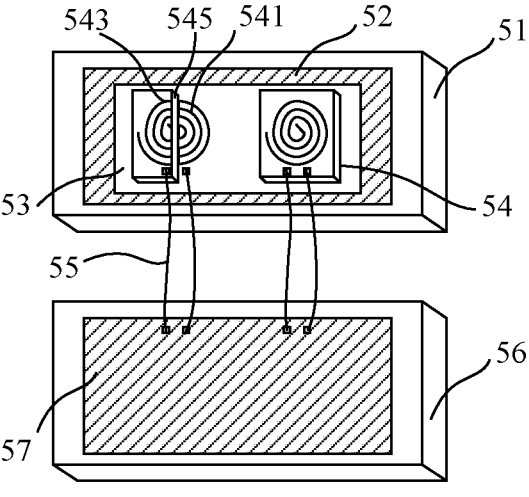
FIG. 5 is a schematic block diagram of a third example digital isolator, in accordance with embodiments of the present invention.

Referring now to FIG. 5, shown is a schematic block diagram of a third example digital isolator, in accordance with embodiments of the present invention. In this particular example, the digital isolator can include a first die and a second die. The first die can include substrate 51, circuit 52 formed on substrate 51, electromagnetic shielding structure 53 covering circuit 52, and isolated transmission structure 54 formed on electromagnetic shielding structure 53. For example, substrate 51 can be a silicon (Si) wafer, and circuit 52 and isolated transmission structure 54 can be integrated on substrate 51. Optionally, substrate 51 may be made of other suitable materials (e.g., germanium [Ge], gallium arsenide [GaAs], silicon germanium [SiGe], etc.). In addition, circuit 52 can be one of the encoding circuit or decoding circuit, and may be formed on substrate 51 through any suitable semiconductor process flow (e.g., deposition processes, etching processes, ion implantation processes, etc.).

Electromagnetic shielding structure 53 can be located between circuit 52 and isolated transmission structure 54. Electromagnetic shielding structure 53 can be formed above circuit 52, and may cover circuit 52. Electromagnetic shielding structure 53 can reduce the magnetic field interference of circuit 52 to isolated transmission structure 54, and may reduce the influence of the magnetic field change generated by isolated transmission structure 54 when transmitting the encoded signal on electrical characteristics of circuit 52, thereby improving electromagnetic compatibility (EMC) of the digital isolator by electromagnetic shielding structure 53. In particular embodiments, electromagnetic shielding structure 53 may include at least one insulating layer and a metal shielding layer, and the insulating layer and metal shielding layer can be stacked vertically in sequence. Optionally, the metal shielding layer can adopt a mesh structure or a sheet structure.

In particular embodiments, isolated transmission structure 54 can be the isolation element shown in FIGS. 1 and 2. Isolated transmission structure 54 can include winding 541, insulation layer 545, covering winding 541, and winding 543 located on insulation layer 545. Winding 541 can be set perpendicularly to the corresponding winding 543, and may transmit the encoded signal by electromagnetic induction. Insulating layer 545 can withstand an isolation voltage required by the special test specification of isolated transmission structure 54. For example, the material of insulating layer 545 can be polyimide (PI), silicon dioxide (SiO5), or silicon nitride (Si3N4). It should be understood that in order to more intuitively reflect the positional relationship between the windings, this example carries out sectional treatment on insulation layer 545 and winding 543 shown in FIG. 5.

Furthermore, windings 541 and 543 in this example can be planar coils. It should be understood that when the number of coupled windings is multiple, each winding 541 and each winding 543 can be set side-by-side. Further, windings 541 and 543 can be wound along a predetermined direction (e.g., a clockwise direction, a counterclockwise direction, etc.). Optionally, the materials of windings 541 and 543 may be high conductivity materials, such as gold (Au), copper (Cu), or silver (Ag). Further, windings 541 and 543 may be formed by a corresponding deposition process, such as a chemical vapor deposition (CVD) or a physical vapor deposition (PVD) process. In particular embodiments, winding 541 can be electrically connected to circuit 52 through a through-hole. Winding 543 can be electrically connected with circuit 57 deposited on substrate 56 of the second die through lead wire 55. Circuit 57 can be another circuit in the encoding circuit or decoding circuit. The material of lead wire 55 may be gold (Au) or aluminum (Al), for example. Lead wire 55 can be pressed-fit connection at the connection pad of winding 543 and the connection pad of circuit 57 by wire bonding.

The digital isolator of particular embodiments include a first die and a second die electrically connected to the first die. The first die can include a first substrate, a first circuit formed on the first substrate, an electromagnetic shielding structure covering the first circuit, and an isolated transmission structure arranged on the electromagnetic shielding structure. The second die can include a second substrate separated from the first substrate and a second circuit formed on the second substrate. The first circuit can be one of the encoding circuit or decoding circuit, and the second circuit may be the other of the encoding circuit or decoding circuit. The isolated transmission structure can transmit the encoded signal in an electrically isolated manner. By forming one of the encoding circuit or the decoding circuit with the isolated transmission structure on the first substrate in a vertically overlapping manner, and forming the other of the encoding circuit or the decoding circuit on the second substrate separated from the first substrate, this may improve utilization of the substrate, and can reduce the die area and the die cost without affecting the performance of the digital isolator.

It should be understood that the first die and the second die in this example may both be bare dies (die). Further, the first die and the second die can be packaged in the same housing by using the packaging technology to protect the first die and the second die from being disturbed or destroyed by the external environment. It should be understood that based on the scenarios and environment of the digital isolator, an appropriate form of packaging can be selected, such as dual in-line package (DIP), quad-flat package (QFP), or ball grid array (BGA) package, and suitable packaging materials (e.g., plastic, ceramic, metal materials, etc.) can be utilized.

Figure 6:
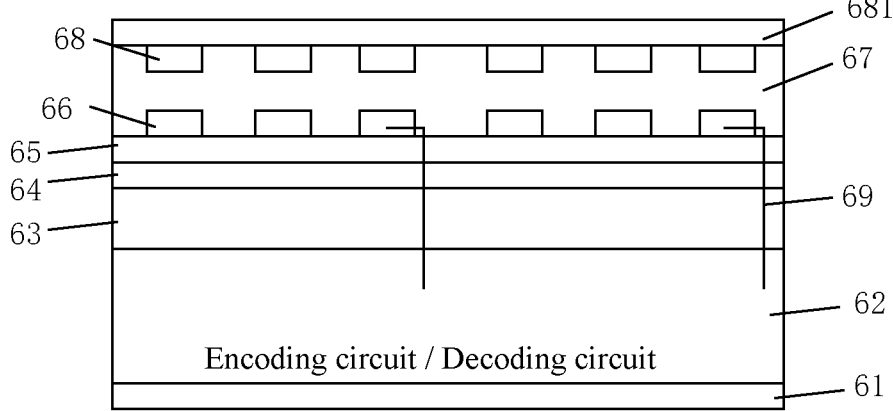
FIG. 6 is a transverse section diagram of a first die of the first example of a digital isolator, in accordance with embodiments of the present invention.

Referring now to FIG. 6, shown is a transverse section diagram of a first die of the first example of a digital isolator, in accordance with embodiments of the present invention. In this particular example, a first die can include substrate 61, circuit 62, insulating layer 63, metal shielding layer 64, insulating layer 65, winding 66, insulating layer 67, and winding 68. Substrate 61 can be a silicon (Si) wafer, circuit 62 may be deposited on substrate 61, and circuit 62 can be one of an encoding circuit or a decoding circuit. Circuit 62 can be covered with insulating layer 63, metal shielding layer 64, and insulating layer 65. Insulating layer 63, metal shielding layer 64, and insulating layer 65 can be electromagnetic shielding structures for isolating circuit structures and isolating transmission structures.

Optionally, the metal shielding layer may adopt a mesh structure or a sheet structure. At least one winding 66 may also be formed on insulating layer 65. It should be understood that when the number of windings 66 is multiple, each winding 66 can be set side-by-side. Further, winding 66 can be a planar coil wound in a predetermined direction (e.g., a clockwise or a counterclockwise) direction. Winding 66 can be covered with insulating layer 67. Insulating layer 67 can withstand an isolation voltage generated by windings 66 and 68 during operation. Winding 68 can be arranged opposite to winding 66 in the vertical direction, and may be formed on insulating layer 67. Also, windings 68 and 66 can be planar coils wound in the same direction.

In particular embodiments, the materials of windings 66 and 68 may be high conductivity materials, such as copper (Cu), gold (Au), and silver (Ag). Furthermore, each of winding 66 can be electrically connected to circuit 62 via through-hole 69. Here, through-hole 69 can be a metal through-hole formed by deposition of high conductivity materials, such as copper (Cu), gold (Au), and silver (Ag). For example, the materials of insulating layer 63, insulating layer 65, and insulating layer 67 can be insulating materials, such as polyimide (PI), silicon dioxide ($SiO_2$) or silicon nitride ($Si_6N_4$). Winding 66 can also be electrically connected to the first circuit by wire bonding. The insulating layers can be formed by chemical vapor deposition process, physical vapor deposition process, or direct spin coating process. Insulating layer 681 can be formed on winding 68, and may protect the internal circuit structure and electromagnetic shielding structure, in order to avoid physical or chemical damage to the digital isolator and improve the stability of the digital isolator. For example, the material of insulating layer 681 may be an insulating material, such as PI, $SiO_2$, or $Si_3N_4$.

Figure 7:
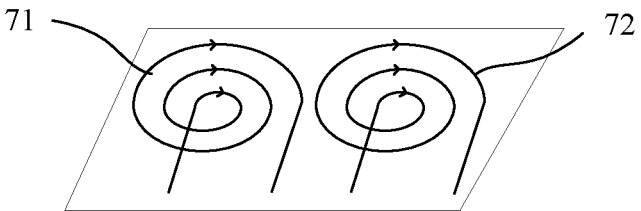
FIG. 7 is a schematic block diagram of a first example coil arrangement of an isolated transmission structure, in accordance with embodiments of the present invention.
Figure 7:
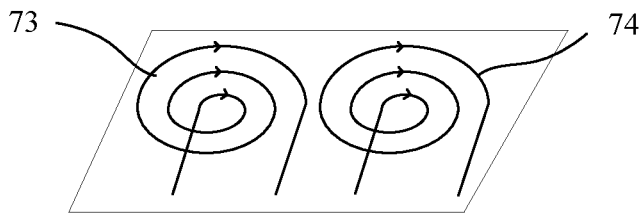

Referring now to FIG. 7, shown is a schematic block diagram of a first example coil arrangement of an isolated transmission structure, in accordance with embodiments of the present invention. In this particular example, the isolated transmission structure can include windings 71 and 72, and windings 73 and 74. Windings 71 and 72 can be planar coils wound along a clockwise direction. Windings 71 and 72 may be arranged side-by-side, windings 73 and 74 may be arranged side-by-side, windings 71 and 73 can be arranged in a vertical direction, and windings 72 and 74 can be arranged in the vertical direction. It should be understood that in particular application processes, the number of windings arranged and the winding direction of the coil can be adjusted according to particular needs.

Figure 8:
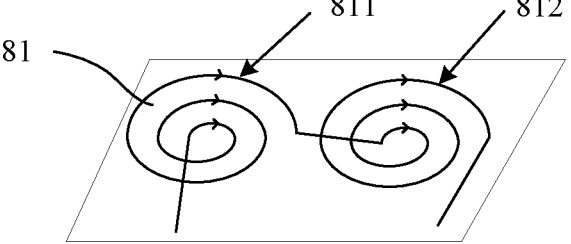
FIG. 8 is a schematic block diagram of a second example coil arrangement of an isolated transmission structure, in accordance with embodiments of the present invention.
Figure 8:
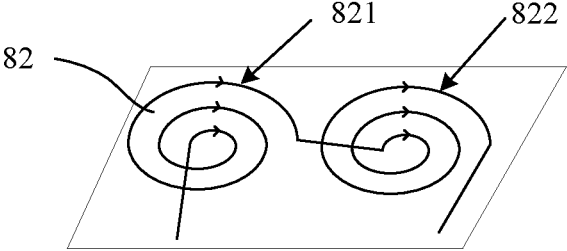

Referring now to FIG. 8, shown is a schematic block diagram of a second example coil arrangement of an isolated transmission structure, in accordance with embodiments of the present invention. In this particular example, the isolated transmission structure can include windings 81 and 82, which can be planar coils. Winding 81 can include part 811 wound along a predetermined direction, and part 812 wound along the predetermined direction in the side-by-side area of the first part. For example, the predetermined direction is a clockwise direction. Winding 81 can include part 821 wound along a predetermined direction, and part 822 wound along the predetermined direction in the side-by-side area of the first part. For example, the predetermined direction is a clockwise direction. It should be understood that the number of windings and the winding direction of the coil can be adjusted according to particular needs.

A digital isolator in particular embodiments can include a first die and a second die electrically connected to the first die. The first die can include a first substrate, a first circuit formed on the first substrate, an electromagnetic shielding structure covering the first circuit, and an isolated transmission structure arranged on the electromagnetic shielding structure. The second die can include a second substrate separated from the first substrate and a second circuit formed on the second substrate. The first circuit may be one of the encoding circuit or decoding circuit, and the second circuit is another of the encoding circuit or decoding circuit. The isolated transmission structure can transmit the encoded signal in an electrically isolated manner. By forming one of the encoding circuit or the decoding circuit with the isolated transmission structure on the first substrate in a vertically overlapping manner, and forming the other of the encoding circuit or the decoding circuit on the second substrate separated from the first substrate, this may improve the utilization of the substrate, and reduce the die area and the die cost without affecting the performance of the digital isolator.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A digital isolator, comprising:
   a) a first die comprising a first substrate, a first circuit formed on the first substrate, and an electromagnetic shielding structure covering the first circuit, wherein the first circuit is one of an encoding circuit and a decoding circuit;
   b) a second die electrically connected to the first die, and comprising a second substrate separated from the first substrate and a second circuit formed on the second substrate, wherein the second circuit is one of the encoding circuit and the decoding circuit that is not in the first die, and the first die and the second die are separated from each other; and
   c) an isolated transmission structure configured to transmit an encoded signal generated by the encoding circuit to the decoding circuit, and arranged on the electromagnetic shielding structure.

2. The digital isolator of claim 1, wherein the electromagnetic shielding structure and the isolated transmission structure are together integrated in one of the first die and the second die.

3. The digital isolator of claim 1, wherein the isolated transmission structure comprises at least one first winding and at least one second winding, wherein the first winding is electrically coupled to the encoding circuit, and the second winding is electrically coupled to the decoding circuit.

4. The digital isolator of claim 3, wherein:
   a) when the isolated transmission structure is integrated in the first die and the encoding circuit is integrated in the second die, the second winding is coupled to the encoding circuit through bonding wires; and
   b) when the isolated transmission structure is integrated in the second die and the encoding circuit is integrated in the first die, the first winding is coupled to the encoding circuit through bonding wires.

5. The digital isolator of claim 1, wherein the electromagnetic shielding structure comprises a first insulating layer, a metal shielding layer, and a second insulating layer.

6. The digital isolator of claim 5, wherein the metal shielding layer is configured as a mesh structure.

7. The digital isolator of claim 5, wherein the metal shielding layer is configured as a sheet structure.

8. The digital isolator of claim 3, wherein the isolated transmission structure also comprises a third insulating layer covering the first winding, wherein the second winding is arranged on the third insulating layer, and the first winding is arranged vertically corresponding to the second winding.

9. The digital isolator of claim 3, wherein the first winding is electrically connected with the first circuit through through-holes, and the second winding is electrically connected with the second circuit by leading wires.

10. The digital isolator of claim 3, wherein the first winding and the second winding are both planar coils, the first winding and the second winding are wound along a predetermined direction, and the predetermined direction is a clockwise direction or a counterclockwise direction.

11. The digital isolator of claim 3, wherein the first winding and the second winding are both planar coils, the first winding and the second winding comprise a first part wound along the predetermined direction and a second part wound along the predetermined direction in a side-by-side area of the first part, and the predetermined direction is a clockwise direction or a counterclockwise direction.

12. The digital isolator of claim 3, wherein the isolated transmission structure further comprises an insulating layer covering the second winding.

13. The digital isolator of claim 1, wherein:
a) the encoding circuit is configured to receive an input digital signal, and to convert the input digital signal into the encoded signal; and
b) the decoding circuit is configured to receive the encoded signal, and to convert the encoded signal into an output digital signal that is consistent with the input digital signal.

14. The digital isolator of claim 1, wherein the isolated transmission structure is vertically overlapped with the first circuit.

* * * * *